Patented Aug. 24, 1926.

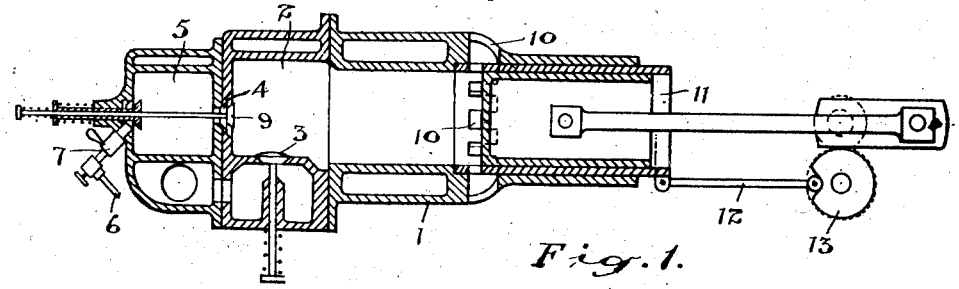
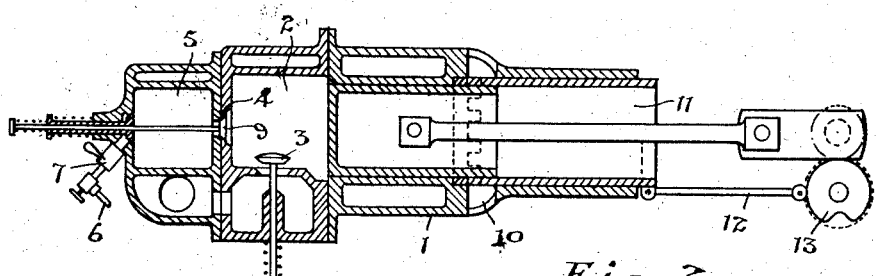
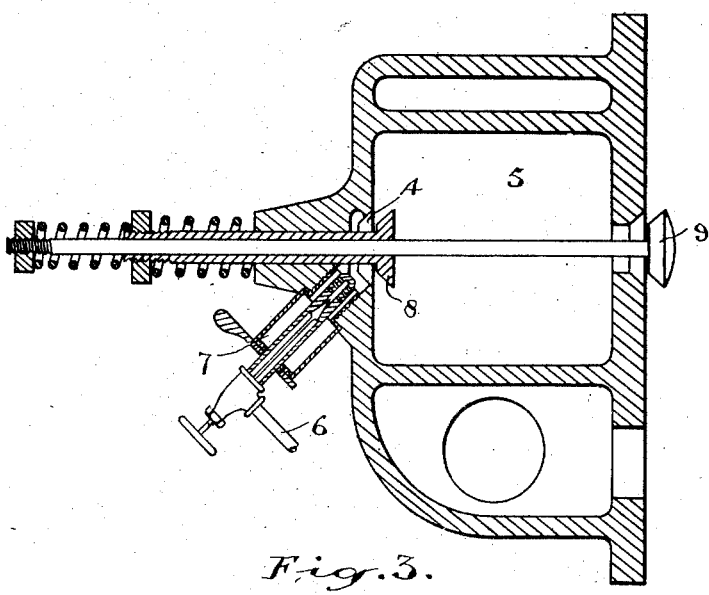

1,597,297

UNITED STATES PATENT OFFICE.

WILLIAM E. SHORE, OF NEW YORK, N. Y.

INTERNAL-COMBUSTION ENGINE.

Application filed July 31, 1922. Serial No. 578,647.

In the present forms of internal combustion engines air is drawn into the cylinder by the piston following the closing of the exhaust ports and the fuel is either drawn in with the full charge of air, or is injected.

The present invention contemplates a radical change in that the full charge of fuel together with a small quantity of air is drawn into the cylinder and this charge of fuel and air is expanded, absorbing the heat of mechanical energy developed and the heat from the walls of the cylinder generated by the previous combustion. Following such expansion the cylinder is opened to atmosphere through an extremely large port allowing a free inflow of air at atmospheric pressure to fill the partially evacuated chamber. This instantaneous flow mixes thoroughly with the expanded fuel without precipitation and the charged volume of gas contained in the cylinder is then compressed so that when it is ignited it develops the maximum amount of power.

The principal feature of the invention consists in highly expanding the fuel and increasing the volume of combustible gas by supplying a charge of gas at a higher pressure than the expanded fuel to mix therewith.

In the drawings, Figure 1 is a longitudinal sectional diagram of an engine cylinder illustrating the application of this invention, the piston being shown at the bottom end of the suction stroke.

Figure 2 is a view similar to Figure 1 showing the piston at the top end of the exhaust stroke.

Figure 3 is an enlarged sectional detail showing the intake valve arrangement.

In the diagrammatic illustration the cylinder 1 is shown with a combustion chamber 2 in the head having an exhaust valve 3 and an intake port 4. The intake port communicates with an auxiliary chamber 5 into which the fuel supply pipe 6 enters. A controlled supply of air enters with the fuel, being controlled by the member 7 and the entrance of both air and fuel is preferably arranged in the seat of the valve 8. The stem of the valve 8 is preferably tubular and through it extends the stem of a valve 9 which operates in the intake port 4. The mechanism for operating these valves is not shown as they may be operated in any well known manner.

The important feature illustrated in this diagram is that the cylinder 1 is provided with ports to permit the introduction of the atmospheric charge, which ports 10 are here shown as circumferentially arranged at a point immediately above the head of the piston when the piston has reached the limit of its inward stroke. The ports 10 are closed by a suitable form of a valve here shown as a sleeve 11 operated through a rod 12 and cam 13.

A suitable control for the oil is provided in the fuel pipe 6 so that a certain definite quantity of oil will be drawn in at each suction stroke. The suction of the piston draws the valve 9 open thereby connecting the combustion chamber with the auxiliary chamber 5 and draws a charge of nebulized fuel from the auxiliary chamber and coincidently draws a further charge of air and fuel into said auxiliary air chamber. The movement of the piston in the suction stroke rarifies the atmosphere of air and oil within the cylinder in such a manner that it is highly expanded and readily absorbs heat from the cylinder walls.

As the piston reaches the limit of its suction stroke the cam 13 operates the sleeve 11 to open the cylinder ports 10 and air at atmospheric pressure is admitted freely with the consequence that a very large volume passes into the cylinder. The volume thus entered is very much greater than the volume that can be drawn through the ordinary intake valves in the ordinary suction stroke of the piston and as the ports 10 provide a very wide opening there will be no wire drawing and the cylinder will always fill at atmospheric pressure. The compression stroke of the piston will under such conditions naturally produce a much higher compression, consequently the fuel in the first instance highly nebulized by the expansion is raised in temperature by the compression and a very effective result is produced.

The air ports 10 remain closed during compression, firing and exhaust strokes of the piston and open only at the completion of the suction stroke. The auxiliary chamber 5 herein shown may be dispensed with and the fuel taken directly into the combustion chamber though this auxiliary chamber performs a very distinct function in the producing of satisfactory results. It is open only during the suction stroke and immediately the ports 10 are open the reverse pressure closes the valves 8 and 9 with the result that the chamber 5 remains sealed with a charge of air and fuel in a rarefied condition after being subjected to expansion and it remains in a state of rest during the compression, firing and exhaust strokes and is further expanded by the circulation of exhaust gases therearound through the hollow wall 14 before it is brought into the working cylinder and still further expanded.

A combustion engine constructed on the principles herein described may be operated with almost any kind of combustible oil as the expansion has the effect of breaking up the particles of the denser oils into a very fine nebular state without the necessity of external forms of carburetion and a fuel in such state when mixed with a suitable quantity of combustion supporting gas will readily ignite.

What I claim as my invention is:—

1. In an internal combustion engine, the combination with a cylinder, of a jacketed combustion chamber arranged in the path of the engine exhaust, a fuel mixing chamber communicating with said combustion chamber, valves closing said exhaust heated combustion chamber, ports in the inward end of the cylinder communicating directly with the atmosphere, and a valve closing said ports.

2. In an internal combustion engine, the combination with a cylinder, of a combustion chamber jacketed to receive the engine exhaust, a fuel mixing chamber communicating with said combustion chamber, an atomizer directing atomized fuel into said mixing chamber along with a restricted quantity of combustion supporting medium, a valve controlling the flow of atomized fuel into the mixing chamber, a valve controlling the flow of mixed fuel into the combustion chamber, ports at the inner end of the cylinder, a valve controlling said ports, and a piston adapted to uncover said ports when opened by the valve.

3. In an internal combustion engine, the combination with a cylinder, of an enlarged combustion chamber having a jacket spaced from and forming a closed outer chamber therearound, an exhaust port opening from said combustion chamber into said closed outer chamber, a fuel mixing chamber connected with said combustion chamber, means for projecting fuel into said mixing chamber along with a restricted quantity of air insufficient to support combustion, ports in the inner end of the cylinder open to atmosphere, a valve closing said ports during the power stroke and opening said ports in the suction stroke, and a piston co-operating with said valve.

4. In an internal combustion engine, the combination with a cylinder, of a combustion head jacketed to receive the engine exhaust, a mixing chamber mounted upon said combustion head and jacketed to receive the exhaust from around said jacketed combustion head, an opening communicating with the interior of said combustion head and mixing chamber, a valve closing said opening, means for introducing fuel into said jacketed mixing chamber, and means for introducing air into the cylinder at atmospheric pressure at the end of the suction stroke.

WILLIAM E. SHORE.